(12) United States Patent
Sahlhoff

(10) Patent No.: US 9,910,206 B2
(45) Date of Patent: Mar. 6, 2018

(54) MICRO-OPTICAL ELEMENT HAVING SURFACE WITH CURVATURE ABOUT A DIRECTION EXTENDING IN A PLANE PARALLEL TO MAJOR SURFACE OF LIGHT GUIDE, AND LIGHT GUIDE AND LIGHTING ASSEMBLY INCLUDING SAME

(71) Applicant: Rambus Delaware LLC, Sunnyvale, CA (US)

(72) Inventor: Dane A. Sahlhoff, Fremont, CA (US)

(73) Assignee: Rambus Delaware LLC, Brecksville, OH (US)

( * ) Notice: Subject to any disclaimer, the term of this patent is extended or adjusted under 35 U.S.C. 154(b) by 11 days.

(21) Appl. No.: 14/870,106

(22) Filed: Sep. 30, 2015

(65) Prior Publication Data

US 2016/0091652 A1   Mar. 31, 2016

Related U.S. Application Data

(60) Provisional application No. 62/076,122, filed on Nov. 6, 2014, provisional application No. 62/057,292, filed on Sep. 30, 2014.

(51) Int. Cl.
*F21V 8/00* (2006.01)

(52) U.S. Cl.
CPC .......... *G02B 6/0036* (2013.01); *G02B 6/0045* (2013.01)

(58) Field of Classification Search
CPC .. G02B 6/0036; G02B 6/0038; G02B 6/0045; G02B 6/0061
See application file for complete search history.

(56) References Cited

U.S. PATENT DOCUMENTS

| 6,752,505 B2 | 6/2004 | Parker et al. | |
| 6,981,792 B2* | 1/2006 | Nagakubo | G02B 6/0036 362/23.15 |
| 7,563,013 B2* | 7/2009 | Lin | G02B 6/0061 362/612 |

(Continued)

OTHER PUBLICATIONS

International Search Report and Written Opinion for related International Application No. PCT/US2015/053073 dated Dec. 23, 2015.

(Continued)

*Primary Examiner* — Robert May
(74) *Attorney, Agent, or Firm* — Renner, Otto, Boisselle & Sklar, LLP

(57) ABSTRACT

A light guide includes a first major surface; a second major surface opposed the first major surface and spaced apart from the first major surface in a thickness direction; a light input edge extending between the major surfaces; and light extracting elements at the first major surface. In some embodiments, at least a portion of the light extracting elements each include: a proximal end at the first major surface and a distal end in the thickness direction; and first and second surfaces, the first surface being a side surface extending between the proximal end and the distal end and having a curvature about a direction extending in a plane parallel to the first major surface. In some embodiments, the major surface of the light guide is curved and the first surface has a curvature about a direction extending along a surface contour of the first major surface.

20 Claims, 9 Drawing Sheets

(56) References Cited

U.S. PATENT DOCUMENTS

| | | | |
|---|---|---|---|
| 8,511,881 B2* | 8/2013 | Hu | G02B 6/0036 362/613 |
| 8,764,269 B2* | 7/2014 | Matsumoto | G02B 6/0036 362/613 |
| 8,851,734 B2* | 10/2014 | Lee | G02B 6/0036 362/619 |
| 9,366,802 B2* | 6/2016 | Lee | G02B 6/0081 |
| 9,684,113 B2* | 6/2017 | Kim | G02B 6/0036 |
| 2006/0203353 A1 | 9/2006 | Park et al. | |
| 2009/0274419 A1 | 11/2009 | Sayers et al. | |
| 2010/0033989 A1 | 2/2010 | Teng et al. | |
| 2011/0255297 A1 | 10/2011 | Belcher et al. | |
| 2015/0160395 A1 | 6/2015 | Sahlhoff et al. | |

OTHER PUBLICATIONS

International Preliminary Report on Patentability for related International Application No. PCT/US2015/053073 dated Apr. 13, 2017.

* cited by examiner

MICRO-OPTICAL ELEMENT HAVING SURFACE WITH CURVATURE ABOUT A DIRECTION EXTENDING IN A PLANE PARALLEL TO MAJOR SURFACE OF LIGHT GUIDE, AND LIGHT GUIDE AND LIGHTING ASSEMBLY INCLUDING SAME

RELATED APPLICATION DATA

This application claims the benefit of U.S. Provisional Patent Application No. 62/057,292, filed Sep. 30, 2014; and claims the benefit of U.S. Provisional Patent Application No. 62/076,122, filed Nov. 6, 2014; the disclosures of which are incorporated herein by reference in their entireties.

BACKGROUND

Energy efficiency has become an area of interest for energy consuming devices. One class of energy consuming devices is lighting devices. Light emitting diodes (LEDs) show promise as energy efficient light sources for lighting devices. For some LED-based lighting assemblies, the light emitted from the light source is input to a light guide and light extracting elements specularly extract the light from the light guide in a defined direction. But visual artifacts may appear at the major surface(s) of the illuminated light guide and can present an issue. Control over light output distribution also continues to be an issue for lighting devices that use LEDs or similar light sources.

DESCRIPTION

Figure 1:
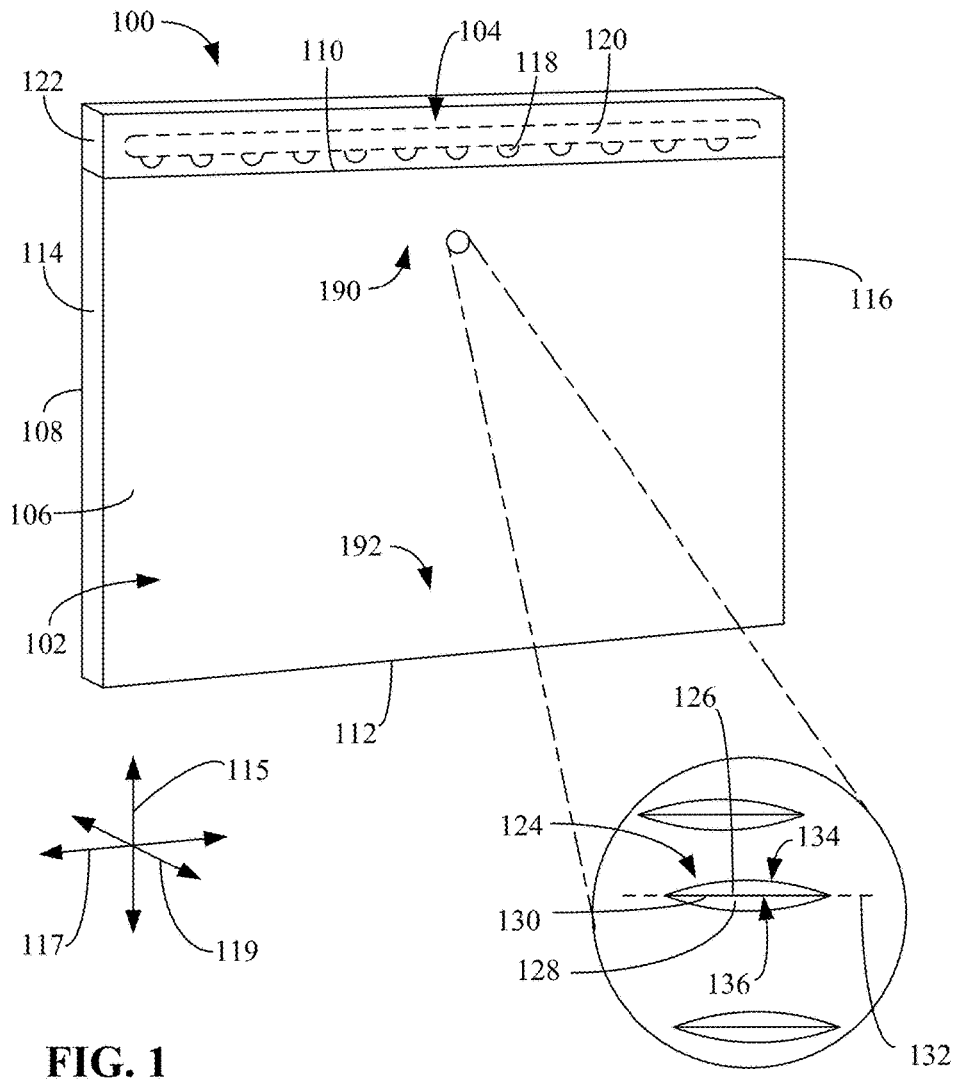
FIGS. 1 and 2 are schematic perspective views of exemplary lighting assemblies.

Embodiments will now be described with reference to the drawings, wherein like reference numerals are used to refer to like elements throughout. The figures are not necessarily to scale. Features that are described and/or illustrated with respect to one embodiment may be used in the same way or in a similar way in one or more other embodiments and/or in combination with or instead of the features of the other embodiments. In this disclosure, angles of incidence, reflection, and refraction and output angles are measured relative to the normal to the surface (e.g., the major surface).

In accordance with one aspect of the present disclosure, a light guide includes: a first major surface; a second major surface opposed the first major surface and spaced apart from the first major surface in a thickness direction; a light input edge extending between the first major surface and the second major surface, the first major surface and the second major surface configured to propagate light input to the light guide through the light input edge therebetween by total internal reflection; and light extracting elements at the first major surface, at least a portion of the light extracting elements each including: a proximal end at the first major surface and a distal end in the thickness direction; and first and second surfaces, the first surface being a side surface extending between the proximal end and the distal end, the first surface having a curvature about a direction extending in a plane parallel to the first major surface.

In accordance with another aspect of the present disclosure, a light extracting element at a major surface of a light guide includes: a proximal end at the major surface and a distal end extended in a thickness direction orthogonal to the major surface; and first and second surfaces, the first surface being a side surface extending between the proximal end and the distal end, the first surface having a curvature about a direction extending in a plane parallel to the major surface.

In accordance with another aspect of the present disclosure, a light guide includes: a first major surface; a second major surface opposed the first major surface; a light input edge extending between the first major surface and the second major surface, the first major surface and the second major surface configured to propagate light input to the light guide through the light input edge therebetween by total internal reflection, the intersection of the light input edge and one of the first major surface and the second major surface defining a first axis, and at least a portion of the light guide curving about an axis orthogonal to the first axis; and light extracting elements at the first major surface, at least a portion of the light extracting elements each including: a proximal end at the first major surface and a distal end spaced apart from the proximal end in a thickness direction orthogonal to the first major surface; and first and second surfaces, the first surface being a side surface extending between the proximal end and the distal end, the first surface having a curvature about a direction extending along a surface contour of the first major surface.

With initial reference to FIG. 1, an exemplary embodiment of a lighting assembly is shown at 100. The lighting assembly 100 includes a light guide 102. The light guide 102 is a solid article of manufacture made from, for example, polycarbonate, poly(methyl-methacrylate) (PMMA), glass, or other appropriate material. The light guide 102 may also be a multi-layer light guide having two or more layers that may differ in refractive index. The light guide 102 includes a first major surface 106 and a second major surface 108 opposite the first major surface 106. The light guide 102 is configured to propagate light by total internal reflection between the first major surface 106 and the second major surface 108. The length and width dimensions of each of the major surfaces 106, 108 are greater, typically ten or more times greater, than the thickness of the light guide 102. The thickness is the dimension of the light guide 102 in a direction orthogonal to the major surfaces 106, 108 (i.e., thickness direction 119). The thickness of the light guide 102 may be, for example, about 0.1 millimeters (mm) to about 10 mm.

At least one edge surface extends between the major surfaces 106, 108 of the light guide in the thickness direction. The total number of edge surfaces depends on the configuration of the light guide. In the case where the light guide is rectangular, the light guide has four edge surfaces 110, 112, 114, 116. In the embodiment shown, the light guide extends in a longitudinal direction 115 between edge surface 110 and edge surface 112; and extends in a lateral direction 117 between edge surface 114 and edge surface 116. Other light guide shapes result in a corresponding number of side edges. Although not shown, in some embodiments, the light guide 102 may additionally include one or more edge surfaces defined by the perimeter of an orifice extending through the light guide in the thickness direction. Each edge surface defined by the perimeter of an orifice extending through the light guide 102 will hereinafter be referred to as an internal edge surface. Depending on the shape of the light guide 102, each edge surface may be straight or curved, and adjacent edge surfaces may meet at a vertex or join in a curve. Moreover, each edge surface may include one or more straight portions connected to one or more curved portions. The edge surface through which light from the light source 104 is input to the light guide will now be referred to as a light input edge. In the embodiment shown in FIG. 1, the edge surface 110 is a light input edge. In some embodiments, the light guide 102 includes more than one light input edge. Furthermore, the one or more light input edges may be straight and/or curved.

Figure 2:
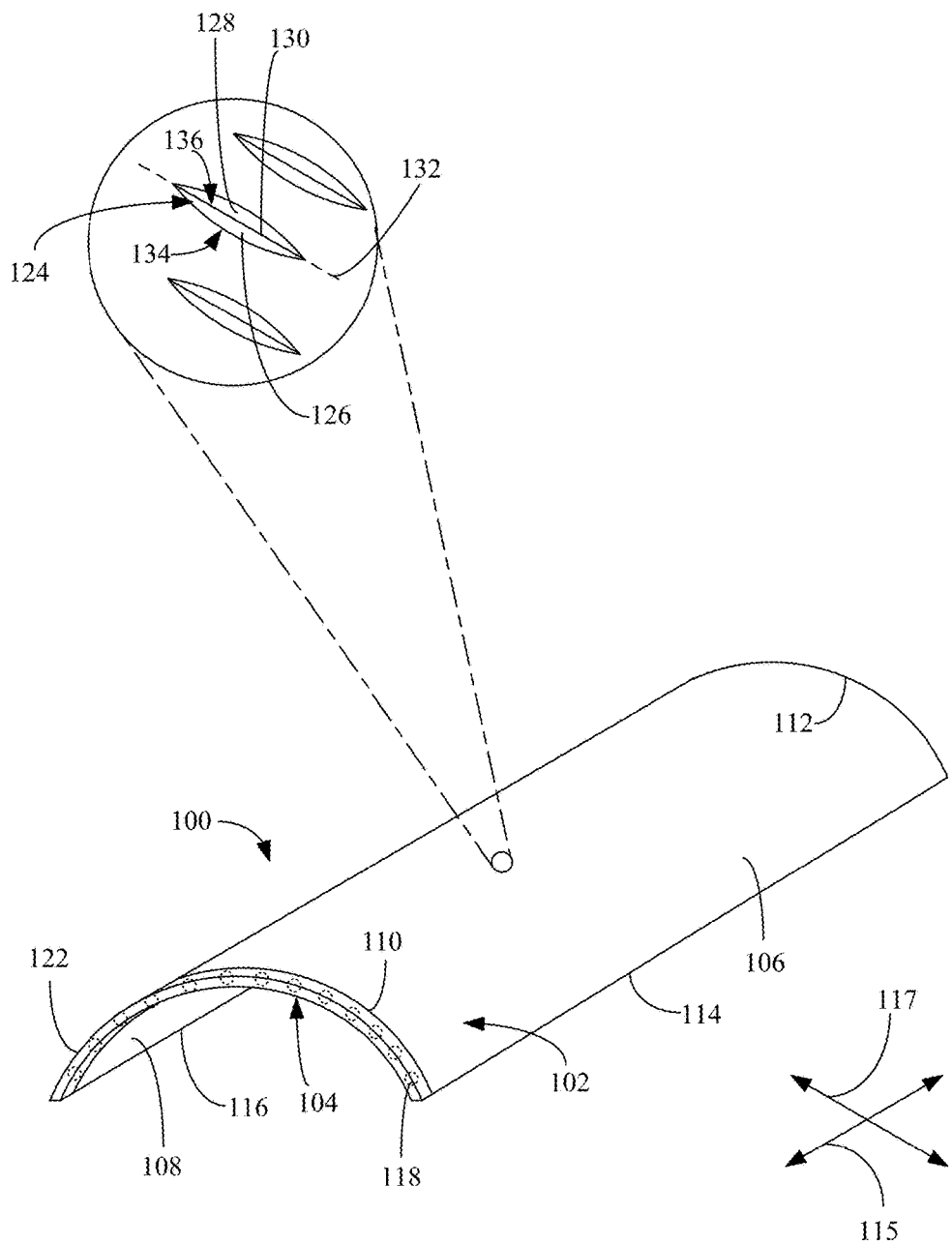

In the embodiment shown in FIG. 1, the major surfaces 106, 108 are planar. In other embodiments, at least a portion of the major surfaces 106, 108 of the light guide 102 is curved in one or more directions. In one example, the intersection of the light input edge 110 and one of the major surfaces 106, 108 defines a first axis, and at least a portion of the light guide 102 curves about an axis parallel to the first axis. In another example, at least a portion of the light guide 102 curves about an axis orthogonal to the first axis. As an example, FIG. 2 shows an embodiment of the lighting assembly 200 wherein the light guide 102 is embodied as a semi-cylindrical body curving about an axis that extends in the longitudinal direction 115 between edge surface 110 and edge surface 112 (e.g., an axis orthogonal to an axis defined by the intersection of the light input edge 110 and one of the major surfaces 106, 108). As shown in FIG. 2, the light guide extends in a longitudinal direction 115 between edge surface 110 and edge surface 112; and extends in a lateral direction 117 between edge surface 114 and edge surface 116. Other exemplary shapes of the light guide include a dome, a hollow cylinder, a hollow cone or pyramid, a hollow frustrated cone or pyramid, a bell shape, an hourglass shape, or another suitable shape.

With continued reference to FIG. 1, the lighting assembly 100 includes a light source 104 positioned adjacent the light input edge 110. The light source 104 is configured to edge light the light guide 102 such that light from the light source 104 enters the light input edge 110 and propagates along the light guide 102 by total internal reflection at the major surfaces 106, 108. In embodiments where the light guide includes more than one light input edge, the lighting assembly 100 may include a corresponding number of light sources 104.

The light source 104 includes one or more solid-state light emitters 118. The solid-state light emitters 118 constituting the light source 104 are arranged linearly or in another suitable pattern depending on the shape of the light input edge of the light guide 102 to which the light source 104 supplies light. Exemplary solid-state light emitters 118 include such devices as LEDs, laser diodes, and organic LEDs (OLEDs). In an embodiment where the solid-state light emitters 118 are LEDs, the LEDs may be top-fire LEDs or side-fire LEDs, and may be broad spectrum LEDs (e.g., white light emitters) or LEDs that emit light of a desired color or spectrum (e.g., red light, green light, blue light, or ultraviolet light), or a mixture of broad-spectrum LEDs and LEDs that emit narrow-band light of a desired color. In one embodiment, the solid-state light emitters 118 emit light with no operably-effective intensity at wavelengths greater than 500 nanometers (nm) (i.e., the solid-state light emitters 118 emit light at wavelengths that are predominantly less than 500 nm). In some embodiments, the solid-state light emitters 118 constituting light source 104 all generate light having the same nominal spectrum. In other embodiments, at least some of the solid-state light emitters 118 constituting light source 104 generate light that differs in spectrum from the light generated by the remaining solid-state light emitters 118. For example, two different types of solid-state light emitters 118 may be alternately located along the light source 104.

The lighting assembly 100 may include one or more additional components. For example, although not specifically shown in detail, in some embodiments of the lighting assembly, the light source 104 includes structural components to retain the solid-state light emitters 118. In the example shown in FIG. 1, the solid-state light emitters 118 are mounted to a printed circuit board (PCB) 120. The light source 104 may additionally include circuitry, power supply, electronics for controlling and driving the solid-state light emitters 118, and/or any other appropriate components.

The lighting assembly 100 may additionally include a housing 122 for retaining the light source 104 and the light guide 102. The housing 122 may retain a heat sink or may itself function as a heat sink. In some embodiments, the lighting assembly 100 includes a mounting mechanism (not shown) to mount the lighting assembly to a retaining structure (e.g., a ceiling, a wall, etc.).

The lighting assembly 100 may additionally include a reflector (not shown) adjacent one of the major surfaces 106, 108. The light extracted through the major surface adjacent the reflector may be reflected by the reflector, re-enter the light guide 102 at the major surface, and be output from the light guide 102 through the other major surface.

The lighting assembly 100 may additionally include a cover element (not shown) adjacent one of the major surfaces 106, 108. The light extracted through the major surface adjacent the cover element may pass through the cover element and may be redirected. The cover element may be a solid article of manufacture made from, for example, polycarbonate, poly(methyl-methacrylate) (PMMA), glass, or other appropriate material; and include a first major surface and a second major surface opposite the first major surface. A major surface of the cover element may be located adjacent one of the major surfaces 106, 108 of the light guide 102. The cover element may include light redirecting elements (e.g., micro-optical elements) at at least one of its major surfaces configured to redirect light passed therethrough.

The light guide 102 includes light extracting elements 124 in, on, or beneath at least one of the major surfaces 106, 108.

Light extracting elements that are in, on, or beneath a major surface will be referred to as being "at" the major surface. Each light extracting element 124 functions to disrupt the total internal reflection of the light propagating in the light guide and incident thereon. In one embodiment, the light extracting elements 124 reflect light toward the opposing major surface so that the light exits the light guide 102 through the opposing major surface. Alternatively, the light extracting elements 124 transmit light through the light extracting elements 124 and out of the major surface of the light guide 102 having the light extracting elements 124. In another embodiment, both types of light extracting elements 124 are present. In yet another embodiment, the light extracting elements 124 reflect some of the light and refract the remainder of the light incident thereon. Therefore, the light extracting elements 124 are configured to extract light from the light guide 102 through one or both of the major surfaces 106, 108.

Exemplary light extracting elements 124 include features of well-defined shape, such as V-grooves and truncated V-grooves. Other exemplary light extracting elements 124 include micro-optical elements, which are features of well-defined shape that are small relative to the linear dimensions of the major surfaces 106, 108. The smaller of the length and width of a micro-optical element is less than one-tenth of the longer of the length and width (or circumference) of the light guide 102 and the larger of the length and width of the micro-optical element is less than one-half of the smaller of the length and width (or circumference) of the light guide 102. The length and width of the micro-optical element is measured in a plane parallel to the major surface 106, 108 of the light guide 102 for planar light guides or along a surface contour for non-planar light guides 102.

Light extracting elements 124 of well-defined shape (e.g., the above-described grooves and micro-optical elements) are shaped to predictably reflect or refract the light propagating in the light guide 102. In some embodiments, at least one of the light extracting elements 124 is an indentation (depression) of well-defined shape in the major surface 106, 108. In other embodiments, at least one of the light extracting elements 124 is a protrusion of well-defined shape from the major surface 106, 108. The light extracting elements of well-defined shape have distinct surfaces on a scale larger than the surface roughness of the major surfaces 106, 108. Light extracting elements of well-defined shape exclude features of indistinct shape or surface textures, such as printed features of indistinct shape, inkjet printed features of indistinct shape, selectively-deposited features of indistinct shape, and features of indistinct shape wholly formed by chemical etching or laser etching.

Light guides having light extracting elements of well-defined shape are typically formed by a process such as injection molding. The light extracting elements are typically defined in a shim or insert used for injection molding light guides by a process such as diamond machining, laser micromachining, photolithography, or another suitable process. Alternatively, any of the above-mentioned processes may be used to define the light extracting elements in a master that is used to make the shim or insert. In other embodiments, light guides without light extracting elements are typically formed by a process such as injection molding or extruding, and the light extracting elements are subsequently formed on one or both of the major surfaces by a process such as stamping, embossing, or another suitable process.

The light extracting elements 124 are configured to extract light in a defined intensity profile (e.g., a uniform intensity profile) and with a defined light ray angle distribution from one or both of the major surfaces 106, 108. In this disclosure, intensity profile refers to the variation of intensity with regard to position within a light-emitting region (such as the major surface or a light output region of the major surface). The term light ray angle distribution is used to describe the variation of the intensity of light with ray angle (typically a solid angle) over a defined range of light ray angles. In an example in which the light is emitted from an edge-lit light guide, the light ray angles can range from −90° to +90° relative to the normal to the major surface. Each light extracting element 124 of well defined shape includes at least one surface configured to refract or reflect light propagating in the light guide 102 and incident thereon such that the light is extracted from the light guide. Such surface(s) is also herein referred to as a light-redirecting surface.

The light extracting elements 124 can be any suitable shape. In the exemplary embodiment shown in FIG. 1, the light guide 102 includes light extracting elements 124 at the major surface 106 configured as v-groove-shaped depressions having an arcuate ridge, hereinafter referred to as "football-shaped" micro-optical elements. A football-shaped micro-optical element resembles the profile of the ball used in American football. Each football-shaped micro-optical element 124 includes a first side surface 126 and a second side surface 128 that come together to form a ridge 130 having ends that intersect the one of the major surfaces 106, 108 at which the micro-optical element is formed. The included angle formed between the first side surface 126 and the second side surface 128 may be any suitable angle, and may be set for extracting light from the light guide 102 at a defined intensity profile and/or light ray angle distribution. As an example, the included angles of the respective football-shaped micro-optical elements may range from 30 degrees to 165 degrees. In some embodiments, the first side surface 126 and the second side surface 128 are symmetric relative to a plane extending parallel to the ridge 130 and extending normal to the major surface. In other embodiments, the first side surface 126 and the second side surface 128 are asymmetric relative to a plane extending parallel to the ridge 130 and extending normal to the major surface.

Figure 11:
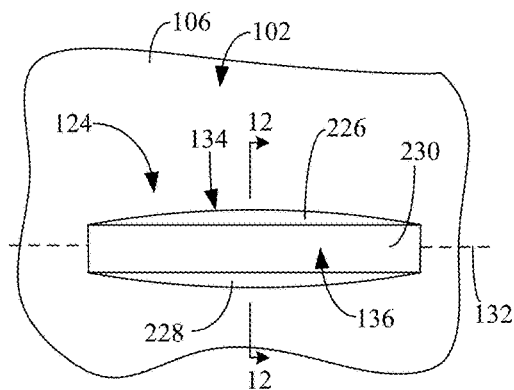
FIG. 11 is a schematic top view of parts of an exemplary lighting assembly.
Figure 15:
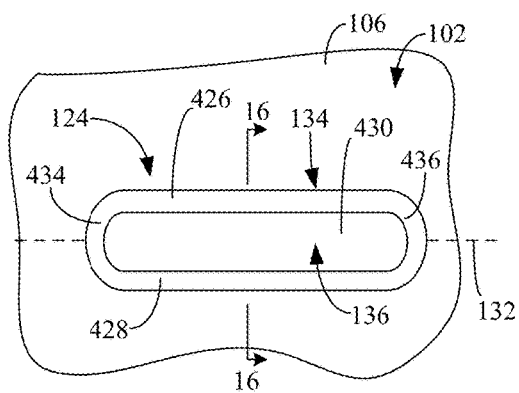
FIG. 15 is a schematic top view of parts of an exemplary lighting assembly.

Other exemplary embodiments of the light guide 102 may include light extracting elements 124 having other suitable shapes. In an example, one or more of the light extracting elements may be configured as a "truncated football-shaped" micro-optical element (FIG. 11). Such shape is regarded as a "truncated" shape in that the shape includes an arcuate end surface that joins the opposed side surfaces instead of a ridge. In another example, one or more of the light extracting elements may be configured as a "dragged" football-shaped micro-optical element or "dragged" truncated football-shaped micro-optical element (not shown). Such "dragged" shapes include a non-uniform radius along its length, with its ridge or end surface including a planar/linear middle portion in between two curved portions. In other examples, one or more of the light extracting elements 124 may be configured as a truncated cone (FIG. 13) or a dragged truncated cone (FIG. 15). Other exemplary micro-optical elements (not shown) include pyramids, truncated pyramids, dragged truncated pyramids, and the like. Still other exemplary micro-optical elements are described in U.S. Pat. No. 6,752,505, the entire content of which is incorporated by reference, and, for the sake of brevity, are not described in detail in this disclosure.

In some embodiments, at least a portion of the light extracting elements 124 each include a longitudinal axis 132. The longitudinal axis extends in a plane parallel to the major surface 106, 108 of the light guide 102 for planar light guides. In embodiments where the light guide is a non-planar light guide (e.g., FIG. 2), the longitudinal axis 132 may instead be referred to as a longitudinal direction that extends along the surface contour of the major surface. With reference to FIG. 1, each football-shaped micro-optical element includes a longitudinal axis 132 extending parallel to the ridge 130. In other embodiments where the light extracting element is a shape other than the football football-shaped micro-optical element, the longitudinal axis 132 may be defined by one of the length or width of the light extracting element in a plane parallel to the major surface 106, 108 of the light guide 102 for planar light guides or along a surface contour for non-planar light guides 102.

In some embodiments, the longitudinal axis 132 extends along the longer of the length or width of the light extracting element 124. In other embodiments, the longitudinal axis 132 extends along the shorter of the length or width of the light extracting element 124. In some embodiments where the length and the width of the light extracting element 124 are the same (e.g., a micro-optical element having a square base), the longitudinal axis 132 may extend along one of the length or the width of the light extracting element 124. The longitudinal axis 132 may be arranged closer to parallel to the light input edge than an axis extending perpendicular to the longitudinal axis and along the other of the length or width of the light extracting element. In the exemplary embodiments shown in FIGS. 1 and 2, the longitudinal axis is arranged parallel to the light input edge 110. In other embodiments, the longitudinal axis may be arranged at an angle relative to the light input edge 110 (e.g., ±45° relative to the light input edge).

The longitudinal axis 132 is distinguishable from other axes of the light extracting element extending in a plane parallel to the major surface 106, 108 of the light guide 102 for planar light guides or along a surface contour for non-planar light guides 102. Accordingly, some light extracting elements (e.g., a conical or frustoconical micro-optical element having a circular base) may not have a distinguishable longitudinal axis.

In some embodiments, the light extracting elements 124 provided at the major surface have the same or nominally the same shape, size, depth, height, slope angle, included angle, surface roughness, orientation, and/or index of refraction. The term "nominally" encompasses variations of one or more parameters that fall within acceptable tolerances in design and/or manufacture. As an example, each of the light extracting elements 124 may have the same or nominally the same football shape shown in FIG. 1. In other embodiments, the light extracting elements may vary in one or more of shape, size, depth, height, slope angle, included angle, surface roughness, orientation, and/or index of refraction. This variation in light extracting elements may achieve a desired light output from the light guide over the corresponding major surface(s). Accordingly, the reference numeral 124 will be generally used to collectively refer to the different embodiments of light extracting elements.

Figure 3:
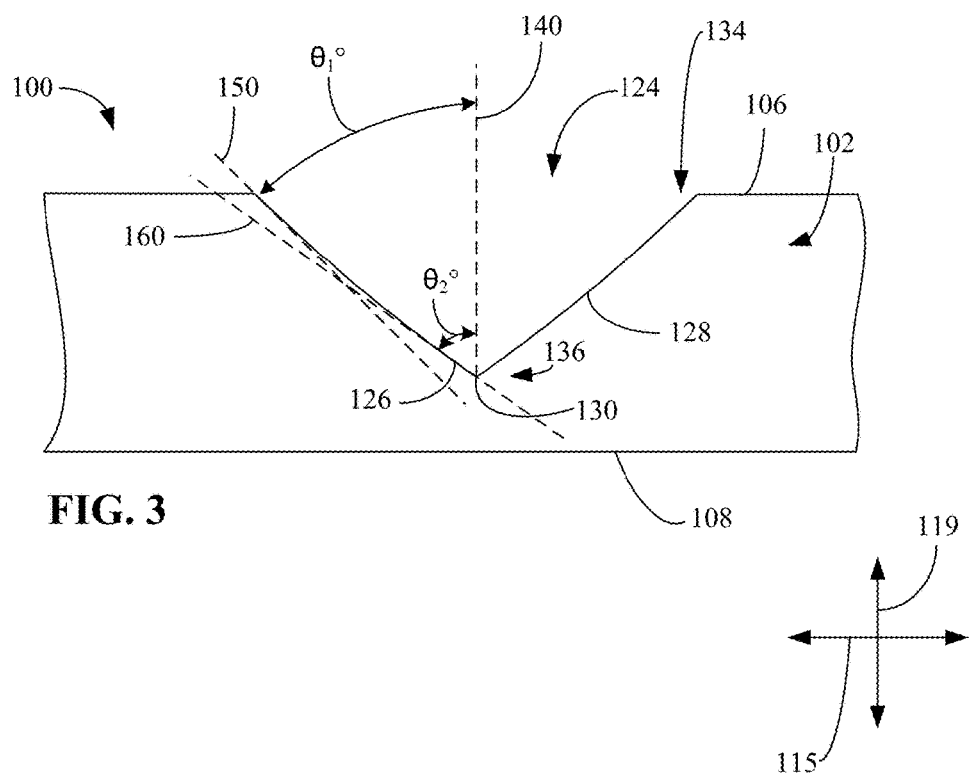
FIG. 3 is a cross-sectional view of parts of an exemplary lighting assembly.

The light extracting elements 124 each extend between a proximal end 134 and a distal end 136 opposite the proximal end 134 in the thickness direction 119. The thickness direction is parallel to the normal 140 to the major surface at which the light extracting element is located (e.g., the normal to the plane parallel to the major surface for planar light guides or the normal to the surface contour for non-planar light guides). The proximal end 134 of the light extracting element 124 is at the intersection of the light extracting element 124 and the major surface at which the micro-optical element is located. The distal end 136 of the light extracting element 124 is located between the major surfaces 106, 108 where the light extracting element is embodied as an indentation, and is located further from the opposed major surface than the proximal end 134 where the light extracting element is embodied as a protrusion. As an example, the ridge 130 of the football-shaped micro-optical element 124 shown in FIGS. 1-3 is at the distal end 136 of the micro-optical element 124.

Each light extracting element 124 includes at least one surface configured to refract or reflect light propagating in the light guide 102 and incident thereon such that the light is extracted from the light guide. Such surface(s) is also herein referred to as a light-redirecting surface. With exemplary reference to the football-shaped micro-optical element shown in FIG. 1, at least one of the first side surface 126 and the second side surface 128 is a light-redirecting surface.

In some embodiments, the light extracting elements 124 (e.g., the first side surface 126 and the second side surface 128) have a low surface roughness. In this disclosure, the term "low surface roughness" refers to a defined surface roughness suitable for specularly reflecting or refracting incident light. In one embodiment, the low surface roughness is an average surface roughness ($R_{a-low}$) less than about 10.0 nm as measured in an area of 0.005 mm$^2$. In another embodiment, the low surface roughness is an average surface roughness ($R_{a-low}$) less than about 5.0 nm as measured in an area of 0.005 mm$^2$. In another embodiment, the low surface roughness is an average surface roughness ($R_{a-low}$) less than about 1.0 nm as measured in an area of 0.005 mm$^2$. A light extracting element with all of its surfaces having a low surface roughness will also be referred to as a low surface roughness light extracting element. As an example, in some embodiments, the low surface roughness light extracting elements may have an average surface roughness ($R_{a-low}$) ranging from about 0.5 nm to about 5.0 nm as measured in an area of 0.005 mm$^2$.

In some embodiments, at least a portion of the light extracting elements 124 include at least one surface having a high surface roughness. In this disclosure, the term "high surface roughness" refers to a defined surface roughness suitable for imparting a diffuse component to incident light that is reflected or refracted. The high surface roughness is greater than the low surface roughness described above. The high surface roughness is a defined roughness intentionally imparted to the at least one surface of the light extracting element. In one embodiment, the high surface roughness is an average surface roughness ($R_{a-high}$) equal or greater than about 0.10 μm as measured in an area of 0.005 mm$^2$. In another embodiment, the high surface roughness is an average surface roughness ($R_{a-high}$) ranging from about 0.10 μm to about 5.0 μm as measured in an area of 0.005 mm$^2$. In another embodiment, the high surface roughness is an average surface roughness ($R_{a-high}$) ranging from about 0.30 μm to about 3.0 μm as measured in an area of 0.005 mm$^2$. In another embodiment, the high surface roughness is an average surface roughness ($R_{a-high}$) ranging from about 0.30 μm to about 1.0 μm as measured in an area of 0.005 mm$^2$.

Light extracting elements 124 such as micro-optical elements may provide specular light extraction from the light guide in a defined intensity profile and with a defined light ray angle distribution. But this specular light extraction may also provide an optically-specular path extending into the light guide from the light input edge. As a result, the surfaces of the light guide including the light extracting elements create an imaging path back to the light source, and reflections of the light source as viewed through the optically-specular path are visible to a viewer viewing the lighting assembly. The discrete solid-state light emitters of the light source may create visual artifacts due to imaging of the light source. Accordingly, even if the light extracting elements are arranged to extract light in a uniform intensity profile over the major surface, the optically-specular path creates the visual effect of one or more relatively high-intensity areas of light at the surface of the light guide. As an example, the relatively high-intensity areas of light may be shown as one or more columns of light extending along the light guide from the light input edge, also referred to as a "headlighting" effect. As another example, the relatively high-intensity areas of light may be shown as one or more bands of light extending in the width direction of the light guide (e.g., relatively parallel to the light input edge), also referred to as a "banding" effect.

Furthermore, undesirable visual effects can occur due to the preservation of the output angle of light at a major surface of the light guide relative to the angle of the light propagating in the light guide that is incident and extracted by the light extracting element. This can lead to one or more distribution discontinuities among the light output from the light guide.

Moreover, undesirable visual effects can occur due to the preservation of the output angle of light at a major surface of the light guide for different respective wavelengths of light propagating in the light guide that are incident and extracted by the light extracting element. This can lead to the appearance of color splitting among the light output from the light guide.

While the headlighting effect, banding effect, the distribution discontinuities, and/or the appearance of color splitting can be reduced by one or more optical adjusters (not shown) (e.g., a diffusing film) located adjacent one or both of the major surfaces 106, 108, the use of the optical adjusters for such purpose destroys the directional, specular light output distribution of the light output from the lighting assembly 100. The use of the optical adjusters also lowers the efficiency of the lighting assembly 100. Furthermore, in many applications (e.g., as a lighting fixture, a sign, a display apparatus, etc.), the use of an optical adjuster is not preferable (e.g., for aesthetic reasons). In addition, the use of an optical adjuster adds cost to the lighting assembly.

In accordance with the present disclosure, and with exemplary reference to FIG. 3, at least a portion of the light extracting elements 124 provided at the major surface(s) 106, 108 of the light guide 102 include one or more surfaces (e.g., one or more side surfaces) having a curvature about a direction (e.g., an axis) extending in a plane parallel to the major surface of the light guide (or about a direction extending along a surface contour of the major surface of a non-planar light guide). In some embodiments, this direction about which the surface curves is parallel to the longitudinal axis of the light extracting element. The term "curvature," when used herein to refer to the curvature of a surface of the light extracting element about a direction extending in a plane parallel to the major surface of the light guide (or about a direction extending along a surface contour of the major surface of a non-planar light guide), is defined as a change in angle of the surface of the light extracting element relative to the normal to the major surface along the surface of the light extracting element extending between the proximal end and the distal end of the light extracting element.

Curvature about a direction extending in a plane parallel to the major surface of the light guide (or about a direction extending along a surface contour of the major surface of a non-planar light guide) is contrasted with a curved shape of a light extracting element when viewed from a direction normal to the major surface of the light guide. For example, while some light extracting elements may have a rounded or partially rounded shape turned about the direction normal to the plane of the major surface, conventionally such light extracting elements have planar side surface(s) when viewed in cross-section.

FIG. 3 shows the cross-section of an exemplary light extracting element 124 configured as a football-shaped micro-optical element such as that shown in FIG. 1. Each of the first and second side surfaces 126, 128 of the light extracting element 124 have a curvature about a direction extending in a plane parallel to the major surface of the light guide (e.g., about the longitudinal axis of the light extracting element, which is perpendicular to the plane of the page in FIG. 3). The light extracting element 124 shown in FIG. 3 is an indentation in the major surface 106 and extends into the light guide in the thickness direction 119 between a proximal end 134 and a distal end 136. As shown, a tangent 150 extending from the first side surface 126 at the proximal end 134 of the micro-optical element 124 is arranged at an angle $\theta_1°$ relative to the normal 140 to the major surface 106. A tangent 160 extending from the first side surface at the distal end 136 of the micro-optical element 124 is $\theta_2°$ relative to the normal 140 to the major surface 106. The angle $\theta_2°$ is greater than the angle $\theta_1°$. This change in angle evidences the curvature in the side surface 126 of the micro-optical element 124.

In some embodiments, the change in angle between a tangent extending from the surface relative to normal to the major surface is constant over the length of the surface between the proximal end 134 and the distal end 136. In other embodiments, this change in angle may vary. For example, surface may include both curved and planar portions. In other examples, the curvature of the surface closer to the proximate end 134 of the light extracting element 124 may be may be greater than the curvature of the surface closer to the distal end 136 of the light extracting element 124, or vice versa.

The light extracting element 124 may have a defined amount of curvature between the proximal end 134 and the distal end 136 of the light extracting element (e.g., the difference between $\theta_2°$ and $\theta_1°$ as shown in FIG. 3). In some embodiments, the curvature between the proximal end 134 and the distal end 136 ranges from 1° to 10°. In other embodiments, the curvature between the proximal end 134 and the distal end 136 ranges from 2° to 8°. In other embodiments, the curvature between the proximal end 134 and the distal end 136 ranges from 4° to 8°. As an example, and with reference to FIG. 3, $\theta_1°$ may be about 54° and $\theta_2°$ may be about 46°, which yields a curvature between the proximal end 134 and the distal end 136 of about 8°. The curvature may be large enough to reduce or prevent undesired visual effects (e.g., headlighting, banding, distribution discontinuities, and/or color splitting), but may be small enough to largely maintain the specular light extraction from the light guide in a defined intensity profile and with a defined light ray angle distribution.

By adding a defined amount of curvature about a direction extending in a plane parallel to the major surface of the light guide (or about a direction extending along a surface contour of the major surface of a non-planar light guide) to the surface(s) (e.g., to the side surface(s)) of at least a portion of the light extracting elements 124 provided at the major surface(s) 106, 108 of the light guide 102, the headlighting/banding effect may be reduced or eliminated. The curvature of the light extracting element between the proximal end 134 and the distal end 136 of the light extracting element 124 creates images in varied directions, thereby disrupting the optically-specular path extending from the light input edge 110 and breaking up an overall continuous image of the light input edge 110. This may provide the visual effect of a nominally uniform light output to a viewer viewing the lighting assembly 100.

Figure 4:
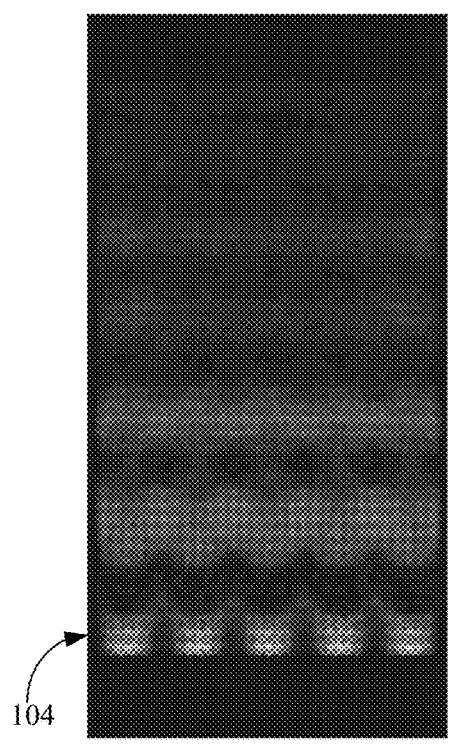
FIGS. 4-6 are photographs showing the visual effect of light emitted from exemplary lighting assemblies.
Figure 5:
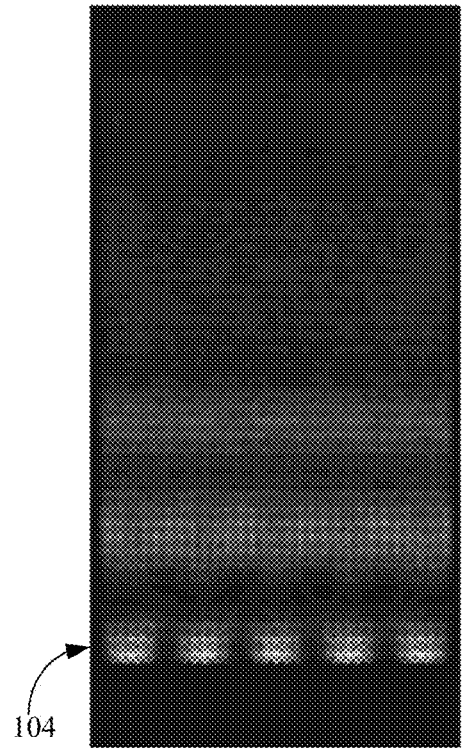
Figure 6:
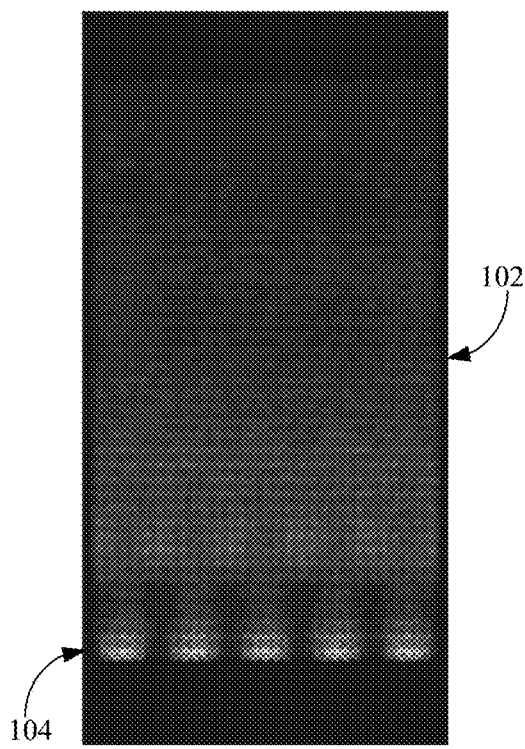

FIGS. 4-6 exemplify a reduction in banding that can be achieved for a lighting assembly including light extracting elements having a curvature about a direction extending in a plane parallel to the major surface of the light guide. For each of FIGS. 4-6, the associated lighting assembly is similar to the lighting assembly 100 shown in FIG. 1. The lighting assembly includes a light guide 102 that is edge lit using a light source 104, and the light guide 102 includes light extracting elements embodied as football-shaped micro-optical element indentations in the major surface. Each light extracting element includes a first side surface 126 and a second side surface 128 that come together to form a ridge 130 having ends that intersect the major surface at which the light extracting element 124 is formed. The lighting assemblies associated with FIGS. 4-6 differ from one another with respect to the amount of curvature of the first and second side surfaces 126, 128 of the light extracting elements.

For the lighting assembly associated with FIG. 4, the first side surface 126 and the second side surface 128 of the light extracting elements do not have a curvature about a direction extending in a plane parallel to the major surface between the proximal end 134 and the distal end 136 (i.e., the surfaces are planar between the proximal end 134 and the distal end 136). As shown in FIG. 4, when illuminated, the light guide includes distinct high intensity banding regions. For the lighting assembly associated with FIG. 5, the first side surface 126 and the second side surface 128 of the light extracting elements each have a curvature about a direction extending in a plane parallel to the major surface between the proximal end 134 and the distal end 136 of 2°. As shown in FIG. 5, when the light guide is illuminated, there is a reduction in the banding as compared with the banding shown in FIG. 4. For the lighting assembly associated with FIG. 6, the first side surface 126 and the second side surface 128 of the light extracting elements each have a curvature about a direction extending in a plane parallel to the major surface between the proximal end 134 and the distal end 136 of 4°. As shown, when the light guide is illuminated, there is a further reduction in the banding as compared with the banding shown in FIGS. 4 and 5.

Furthermore, by adding a defined amount of curvature about a direction extending in a plane parallel to the major surface of the light guide (or about a direction extending along a surface contour of the major surface of a non-planar light guide) to the surface(s) (e.g., to the light-redirecting surface) of at least a portion of the light extracting elements 124 provided at the major surface(s) 106, 108 of the light guide 102, the preservation of the light output angle relative to the input angle can be reduced or eliminated while largely retaining control of the light output distribution. The curvature of the light extracting element between the proximal end 134 and the distal end 136 may vary the output angle of light propagating in the light guide at a specific input angle in a predictable, controllable manner across the light extracting element based on the location at which the propagating light is incident the curved surface.

Figure 7:
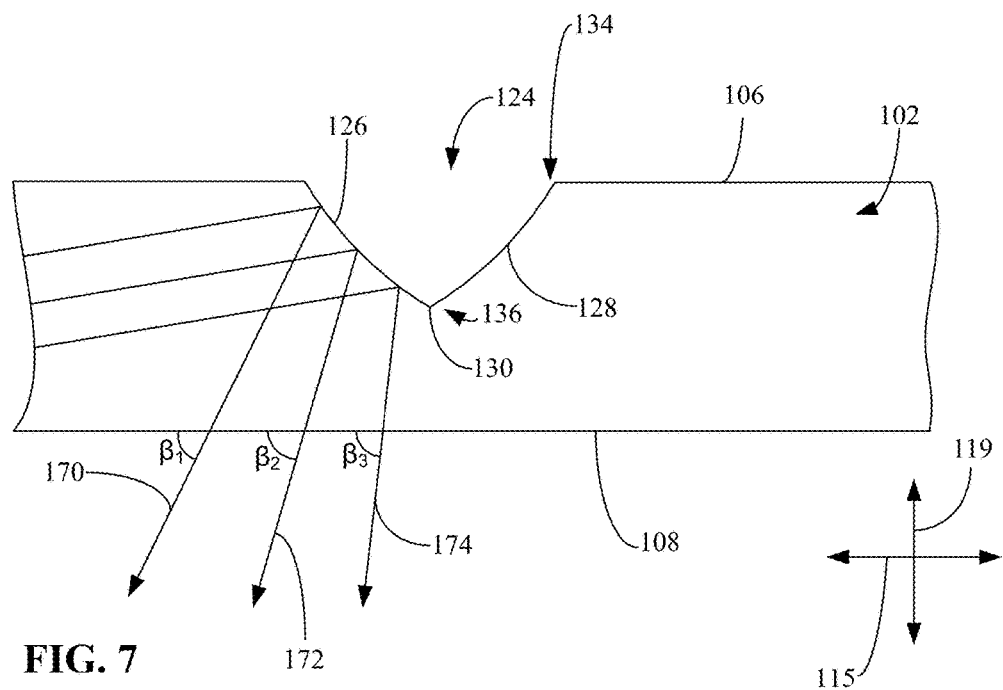
FIG. 7 is a cross-sectional view of parts of an exemplary lighting assembly.

This variation in the output angle is exemplified in FIG. 7, which shows three light rays 170, 172, 174 propagating in the light guide 102 at a given mode of propagation. As shown, each of light rays 170, 172, 174 propagate in the light guide at approximately the same angle relative to the major surfaces 106, 108. Each of the light rays 170, 172, 174 is incident a light extracting element 124 at the major surface 106. The light extracting element 124 is configured as a football-shaped micro-optical element such as that shown in FIGS. 1-3.

Light ray 170 is incident the first side surface 126 of the light extracting element 124 at an area close to the proximal end 134 of the light extracting element 124. The light is refracted by the first side surface 126 and extracted from the light guide 102 through the major surface 108 at a first angle $\beta_1$. Light ray 172 is incident the first side surface 126 of the light extracting element 124 at an area located further from the proximal end 134 of the light extracting element 124 than where the light ray 170 is incident. Due to the curvature present at the first side surface 126 of the micro-optical element 124, the light is refracted by the first side surface 126 and extracted from the light guide 102 through the major surface 108 at a second angle $\beta_2$ different than the first angle $\beta_1$. Light ray 174 is incident the first side surface 126 of the light extracting element 124 at a location closer to the distal end 136 of the light extracting element 124 than where the light rays 170, 172 are incident. Due to the curvature present at the first side surface 126 of the light extracting element 124, the light is refracted by the first side surface 126 and is extracted from the light guide 102 through the major surface 108 at a third angle $\beta_3$ different than the first angle $\beta_1$ and the second angle $\beta_2$.

Figure 8:
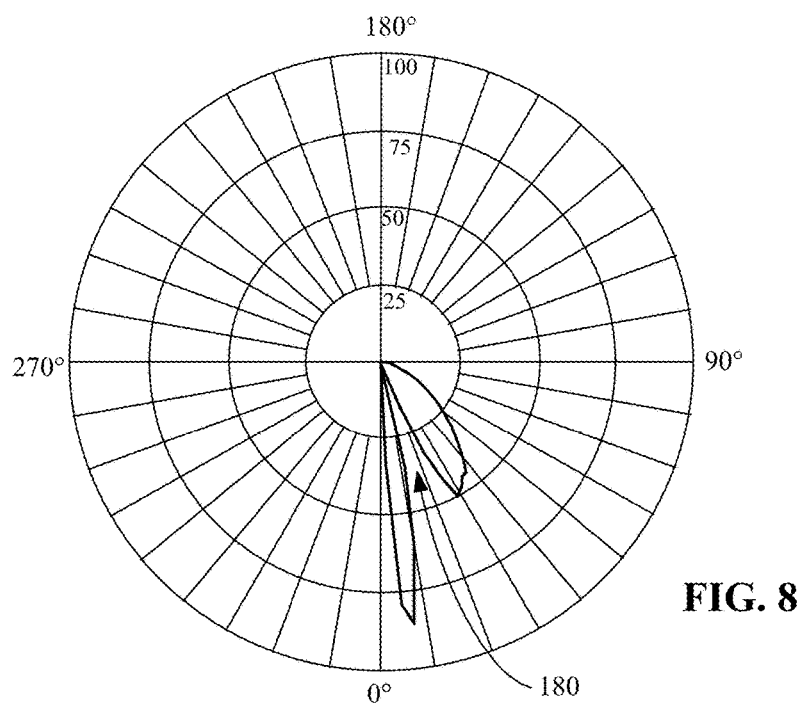
FIGS. 8-10 are light output distribution profiles of exemplary lighting assemblies.
Figure 9:
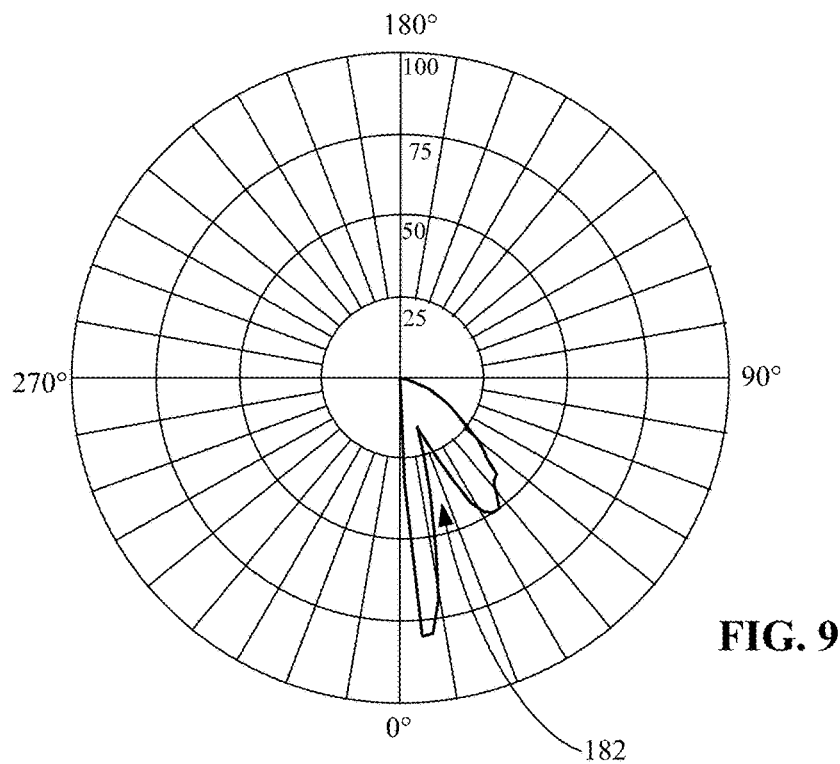
Figure 10:
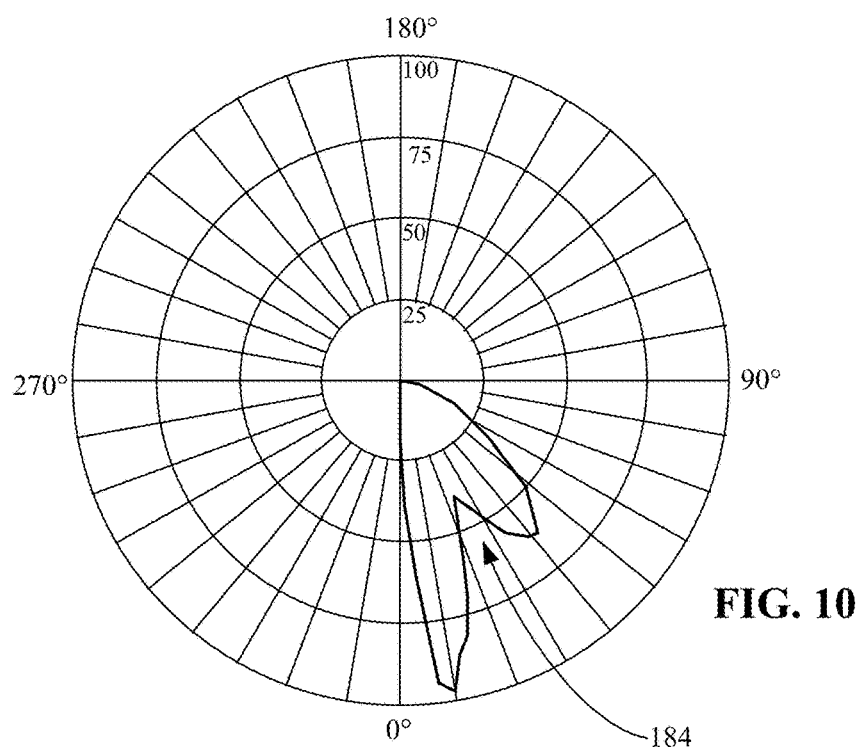

FIGS. 8-10 exemplify a reduction in distribution discontinuity that can be achieved for a lighting assembly including light extracting elements having a curvature about a direction extending in a plane parallel to the major surface of the light guide. More specifically, each of FIGS. 8-10 illustrates a light output distribution showing far-field light ray angle distributions of light extracted from an exemplary lighting assembly. For each of FIGS. 8-10, the lighting assembly is similar to the lighting assembly 100 shown in FIG. 1. The lighting assembly includes a light guide 102 that is edge lit using a light source 104, and the light guide 102 includes light extracting elements embodied as football-shaped micro-optical element indentations. Each light extracting element includes a first side surface 126 and a second side surface 128 that come together to form a ridge 130 having ends that intersect the major surface at which the micro-optical element 124 is formed. The lighting assemblies associated with FIGS. 8-10 differ from one another with respect to the amount of curvature of the first and second side surfaces 126, 128 of the light extracting elements.

The degree scale shown in FIGS. 8-10 represents an azimuth relative to the normal of the major surface 106, 108. The output distribution profile shows the light distribution (vertical beam angle) in a plane orthogonal to the light input edge 110 and to the major surfaces 106, 108 of the light guide 102. For this distribution, the light source 104 is arranged adjacent the light input edge 110 proximate 90°, the major surface 106 is arranged proximate 180°, and the major surface 108 is arranged proximate 0°.

For the lighting assembly associated with FIG. 8, the first side surface 126 and the second side surface 128 of the light extracting elements 124 do not have curvature about a direction extending in a plane parallel to the major surface between the proximal end 134 and the distal end 136 (i.e., the first side surface 126 and the second side surface 128 of are planar between the proximal end and the distal end). As shown, a distribution discontinuity 180 is present in the light output distribution of the light emitted from a light guide. For the lighting assembly associated with FIG. 9, the first side surface 126 and the second side surface 128 of the light extracting elements each have a curvature about a direction extending in a plane parallel to the major surface between the proximal end 134 and the distal end 136 of 4°. As shown in FIG. 9, there is a reduction in the distribution discontinuity 182 present in the light output distribution of the light emitted from a light guide as compared with the distribution discontinuity present in FIG. 8. For the lighting assembly associated with FIG. 10, the first side surface 126 and the second side surface 128 of the light extracting elements each have a curvature about a direction extending in a plane parallel to the major surface between the proximal end 134 and the distal end 136 of 8°. As shown, there is a further reduction in the distribution discontinuity 184 present in the light output distribution of the light emitted from the light guide as compared with the distribution discontinuity present in each of FIGS. 8 and 9.

FIGS. 8-10 further exemplify that in addition to reducing headlighting, banding, distribution discontinuity, and/or color splitting, the light extracting elements having a curvature about a direction extending in a plane parallel to the major surface of the light guide may also provide similar ray angle control of the light extracted from the light guide 102 as compared with the light extracted from a light guide including micro-optical elements that do not have such curvature. The output distribution profiles of each of FIGS. 9 and 10 show that the light distributions (vertical beam angle) are similar to that shown in FIG. 8.

In the exemplary embodiments described above, the light extracting element is configured as a football-shaped micro-optical element. In other embodiments, the light extracting elements may have other configurations and may include one or more surfaces (e.g., one or more side surfaces) having a curvature about a direction extending in a plane parallel to the major surface of the light guide (or about a direction extending along a surface contour of the major surface of a non-planar light guide). In some examples, this curvature is provided at one or more of the side surfaces of the light extracting element, and these side surfaces may or may not be light-extracting surfaces. Exemplary light extracting elements are described below with reference to FIGS. 11-20. FIGS. 11-20 are described herein in the context of a planar light guide (e.g., shown in FIG. 1), but it will be understood that such light extracting elements 124 may be present at the major surface of a non-planar light guide.

Figure 12:
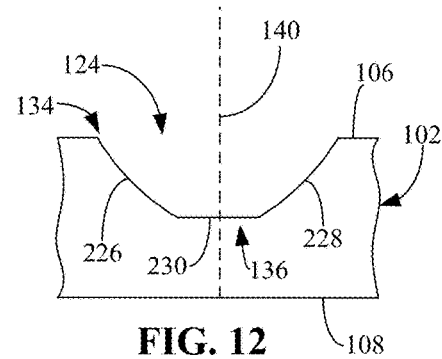
FIG. 12 is a cross-sectional view of parts of the exemplary lighting assembly shown in FIG. 11.

FIGS. 11 and 12 show an exemplary embodiment of a light extracting element 124 at the major surface 106 of the light guide 102 configured as a "truncated football-shaped" micro-optical element. Such shape is regarded as a "truncated" shape in that the shape includes an arcuate end surface 230 that joins the opposed side surfaces 226, 228 instead of a ridge. Conventionally the light extracting element has planar side surfaces 226, 228 when viewed in a cross-section perpendicular to the longitudinal axis 132 of the light extracting element (similar to the view shown in FIG. 12). But as shown in the cross-section in FIG. 12, the first side surface 226 and the second side surface 228 each have a curvature about a direction extending in a plane parallel to the major surface 106 of the light guide 102. The first side surface 226 and the second side surface 228 of the light extracting element each have a curvature between the proximal end 134 and the distal end 136. The curvature of the first side surface 226 and the second side surface 228 between the proximal end 134 and the distal end 136 may be similar to the curvature of the side surfaces described above with respect to embodiment of the football-shaped light extracting element.

Figure 13:
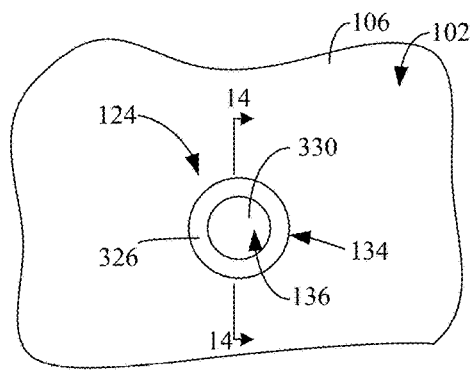
FIG. 13 is a schematic top view of parts of an exemplary lighting assembly.
Figure 14:
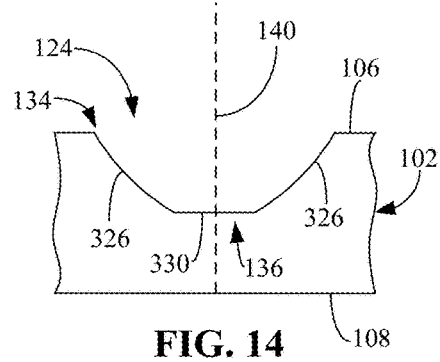
FIG. 14 is a cross-sectional view of parts of the exemplary lighting assembly shown in FIG. 13.

FIGS. 13 and 14 show an exemplary embodiment of a light extracting element 124 at the major surface 106 of the light guide 102 configured as a truncated cone (e.g., a frustoconical-shaped micro-optical element). The truncated cone includes a sloped side surface 326 and an end surface 330 intersecting the side surface 326 at the distal end 136. While this light extracting element is round when viewed from above (e.g., as shown in FIG. 13 having a radius turned about an axis normal to the plane of the major surface), conventionally a "truncated cone" shaped optical element has planar side surface 326 when viewed in cross-section taken along the above-mentioned axis (similar to the view shown in FIG. 14). But as shown in FIG. 14, the side surface 326 has a curvature about a direction extending in a plane parallel to the major surface 106 of the light guide 102. The side surface 326 of the light extracting element 124 has a curvature between the proximal end 134 and the distal end 136. The curvature of the side surface 326 between the proximal end 134 and the distal end 136 may be similar to the curvature of the side surfaces described above with respect to embodiment of the football-shaped light extracting element.

Figure 16:
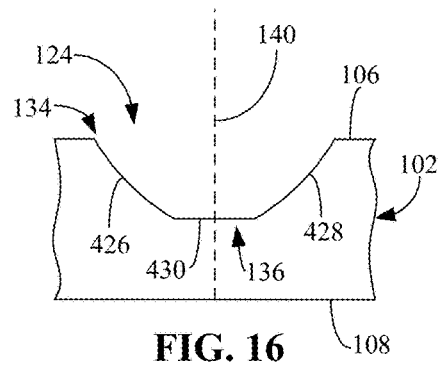
FIG. 16 is a cross-sectional view of parts of the exemplary lighting assembly shown in FIG. 15.

FIGS. 15 and 16 show an exemplary embodiment of a light extracting element 124 at the major surface 106 of the light guide 102 configured as a dragged truncated cone micro-optical element. The dragged truncated cone includes a pair of opposed oppositely sloping planar side surfaces 426, 428, opposed oppositely rounded side surfaces 434, 436 that respectively connect the ends of the planar side surfaces 426, 428, and a planar end surface 430 intersecting the side surfaces 426, 428, 434, 436 at the distal end 136. While a portion of this light extracting element is curved when viewed from above (e.g., the side surfaces 434, 436 shown in FIG. 15 being turned about an axis normal to the plane of the major surface), conventionally the side surfaces are planar when viewed in cross-section taken along the above-mentioned axis (similar to the view shown in FIG. 16). But as shown in FIG. 16, the first side surface 426 and the second side surface 428 each have a curvature about a direction extending in a plane parallel to the major surface 106 of the light guide 124. The first side surface 426 and the second side surface 428 of the light extracting element has a curvature between the proximal end 134 and the distal end 136. The curvature of the first side surface 426 and the second side surface 428 between the proximal end 134 and the distal end 136 may be similar to the curvature of the side surfaces described above with respect to embodiment of the football-shaped light extracting element.

Figure 17:
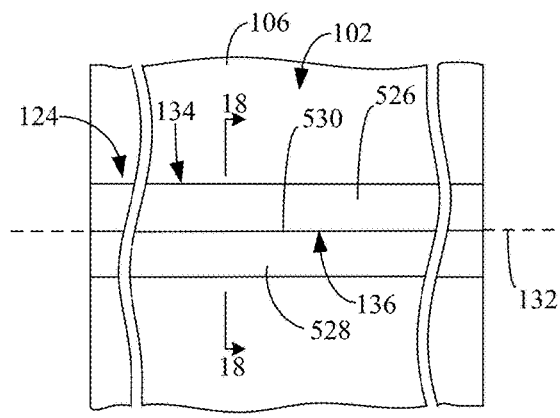
FIG. 17 is a schematic top view of parts of an exemplary lighting assembly.
Figure 18:
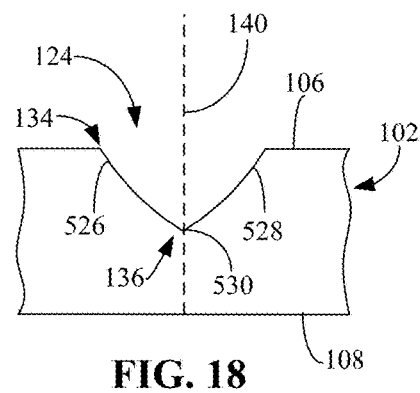
FIG. 18 is a cross-sectional view of parts of the exemplary lighting assembly shown in FIG. 17.

FIGS. 17 and 18 show an exemplary embodiment of a light extracting element 124 at the major surface 106 of the light guide 102 configured as a V-groove. The V-groove includes a first side surface 526 and a second side surface 528 that come together to form a ridge 530. The ridge 530 may extend in a plane parallel to the major surface of the light guide (or along a surface contour of a non-planar light guide). As shown, the ridge 530 may extend parallel to the longitudinal axis 132 of the V-groove. Conventionally the light extracting element has planar side surfaces 526, 528 when viewed in a cross-section perpendicular to the longitudinal axis 132 of the light extracting element (similar to the view shown in FIG. 18). But as shown in FIG. 18, the first side surface 526 and the second side surface 528 each have a curvature about a direction extending in a plane parallel to the major surface 106 of the light guide 102. The first side surface 526 and the second side surface 528 of the light extracting element each have a curvature between the proximal end 134 and the distal end 136. The curvature of the first side surface 526 and the second side surface 528 between the proximal end 134 and the distal end 136 may be similar to the curvature of the side surfaces described above with respect to embodiment of the football-shaped light extracting element.

Figure 19:
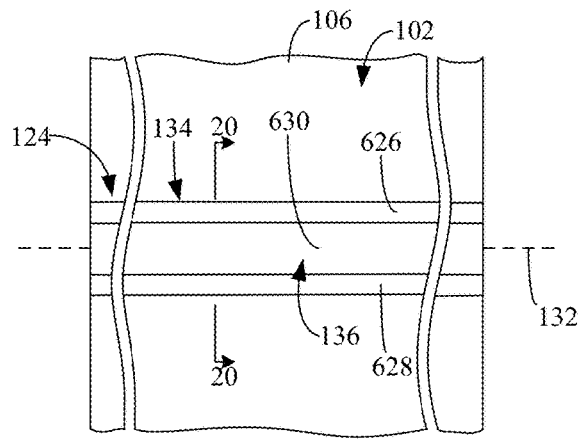
FIG. 19 is a schematic top view of parts of an exemplary lighting assembly.
Figure 20:
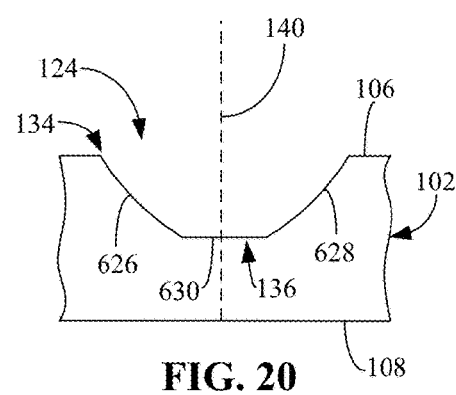
FIG. 20 is a cross-sectional view of parts of the exemplary lighting assembly shown in FIG. 19.

FIGS. 19 and 20 show an exemplary embodiment of a light extracting element 124 at the major surface 106 of the light guide 102 configured as a truncated V-groove. Such shape is regarded as a "truncated" shape in that the shape includes an end surface 630 that joins the opposed side surfaces 626, 628 instead of a ridge. The end surface 630 may extend in a plane parallel to the major surface of the light guide (or along a surface contour of a non-planar light guide). As shown, the end surface 630 may extend parallel to the longitudinal axis 132 of the truncated V-groove. As shown in FIG. 20, the first side surface 626 and the second side surface 628 each have a curvature about an axis extending in a plane parallel to the major surface 106 of the light guide 102. The first side surface 126 and the second side surface 128 of the light extracting element 124 each have a curvature between the proximal end 134 and the distal end 136. The curvature of the first side surface 626 and the second side surface 628 between the proximal end 134 and the distal end 136 may be similar to the curvature of the side surfaces described above with respect to embodiment of the football-shaped light extracting element.

Other exemplary light extracting elements (not shown) include pyramids, truncated pyramids, dragged truncated pyramids, and the like. In such embodiments, one or more surfaces of the light extracting element (e.g., one or more of the side surfaces of the light extracting element) has a curvature about a direction extending in a plane parallel to the major surface of the light guide (or about a direction extending along a surface contour of a major surface of a non-planar light guide). The one or more side surfaces of the micro-optical element may have a curvature between the proximal end 134 and the distal end 136. The curvature of the one or more side surfaces between the proximal end 134 and the distal end 136 may be similar to the curvature of the side surfaces described above with respect to embodiment of the football-shaped light extracting element.

As described above, in some embodiments, the light extracting elements 124 included at the major surface(s) of the light guide have the same or nominally the same shape, size, depth, height, slope angle, included angle, surface roughness, orientation, and/or index of refraction. In an example, for each of the light extracting elements 124 included at the major surface of the light guide 102, the curvature of a surface (e.g., the one or more side surfaces) of the micro-optical element about a direction extending in a plane parallel to the major surface of the light guide may be nominally the same.

In other embodiments, the light extracting elements 124 may vary in one or more of shape, size, depth, height, slope angle, included angle, surface roughness, orientation, and/or index of refraction. As an example, the respective curvatures of a surface (e.g., the one or more side surfaces) of the light extracting elements 124 about a direction extending in a plane parallel to the major surface of the light guide may decrease as a function of distance from the light input edge. For instance, with reference to FIG. 1, the curvature of the surfaces 126, 128 of the light extracting element between the proximal end 134 and the distal end 136 may be 8° at a location 190 proximate the light input edge 110, and the curvature of the surfaces 126, 128 of the light extracting element between the proximal end 134 and the distal end 136 may be 4° at a location 192 that is further from the light input edge.

As another example, the light extracting elements 124 having a surface (e.g., one or more side surfaces) with a curvature about a direction extending in a plane parallel to the major surface of the light guide 102 may be randomly interspersed or interspersed in a predetermined pattern with other light extracting elements that do not include such curvature. For instance, with reference to FIG. 1, the percentage of light extracting elements having a surface (e.g., the one or more side surfaces) with a curvature about a direction extending in a plane parallel to the major surface of the light guide from among the total number of light extracting elements present at a location 190 proximate the light input edge may be higher than the percentage of light extracting elements having a surface (e.g., the one or more side surfaces) with a curvature about a direction extending in a plane parallel to the major surface of the light guide from among the total number of light extracting elements present at a location 192 that is further from the light input edge.

Figure 21:
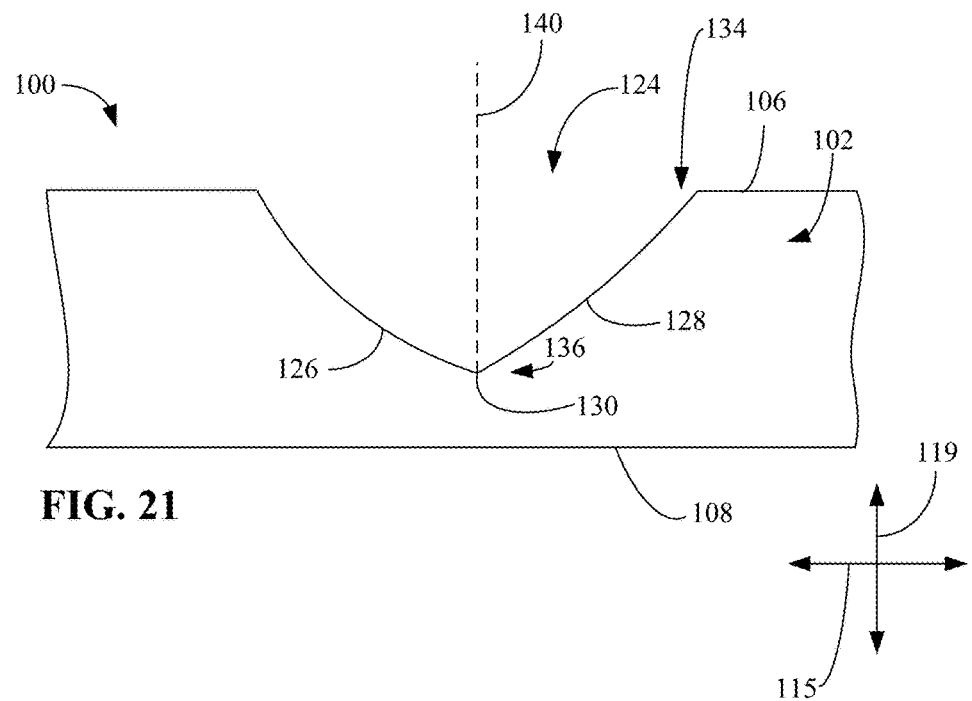
FIGS. 21 and 22 are cross-sectional views of parts of exemplary lighting assemblies.
Figure 22:
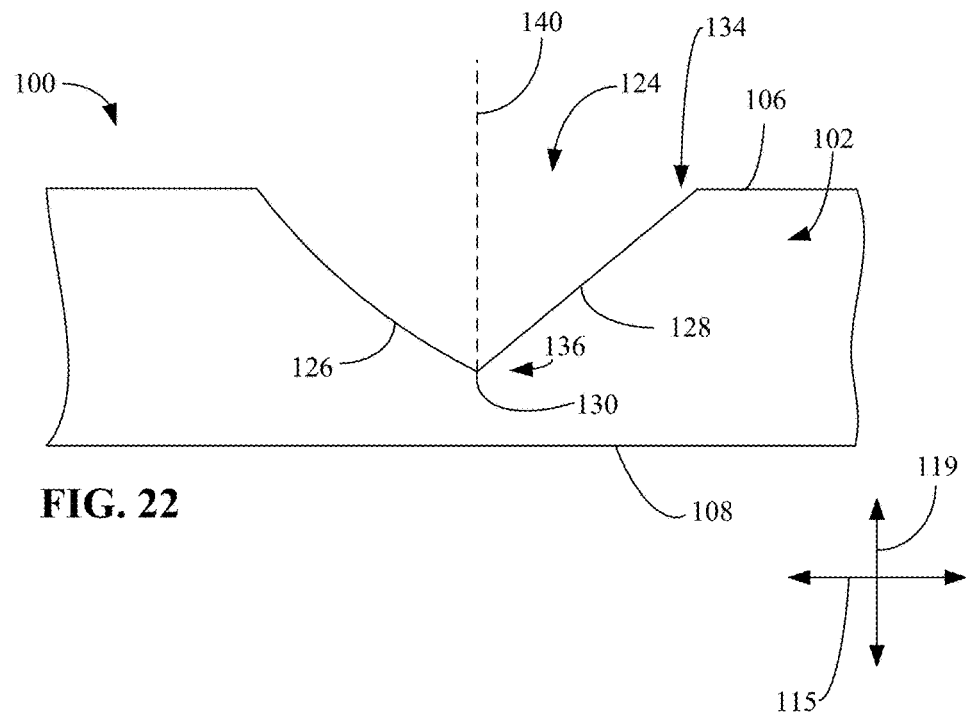

As also exemplified in some of the embodiments described above, each of the side surfaces of a given light extracting element 124 may have a curvature extending about a direction extending in a plane parallel to the major surface of the light guide. For example, FIG. 3 shows that first side surface 126 and second side surface 128 each have a curvature between the proximal end 134 and the distal end 136. In some embodiments, the respective curvatures of these surfaces are nominally the same (e.g., as shown in FIG. 3). In other embodiments, the respective curvatures of these surfaces may be different. For example, FIG. 21 shows an exemplary embodiment of a light extracting element where one of the side surfaces 126 has a curvature between the proximal end 134 and the distal end 136 that is greater than the curvature of the side surface 128 between the proximal end 134 and the distal end 136. For example, the first side surface 126 of the light extracting element may have a curvature between the proximal end 134 and the distal end 136 of 8°, and the second side surface 128 of the light extracting element may have a curvature between the proximal end 134 and the distal end 136 of 4°. FIG. 22 shows another embodiment where one of the side surfaces of a light extracting element (e.g., side surface 126) may be curved about a direction extending in a plane parallel to the major surface of the light guide, while one or more other side surfaces of the light extracting element (e.g., side surface 128) do not have a curvature between the proximal end 134 and the distal end 136.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A light guide, comprising:
   a first major surface;
   a second major surface opposed the first major surface and spaced apart from the first major surface in a thickness direction;
   a light input edge extending between the first major surface and the second major surface, the first major surface and the second major surface configured to propagate light input to the light guide through the light input edge therebetween by total internal reflection; and light extracting elements at the first major surface, at least a portion of the light extracting elements comprising:
- a proximal end at the first major surface and a distal end in the thickness direction;
- a longitudinal axis extending between a first end and a second end of the light extracting element along the first major surface; and
- a first side surface extending between the proximal end and the distal end and extending between the first end and the second end, and a second side surface extending between the proximal end and the distal end and extending between the first end and the second end, the first side surface having a curvature about a direction extending in a plane parallel to the first major surface, the first side surface and the second side surface either coming together to form a ridge or being connected by an end surface, the ridge or end surface extending between the first end and the second end and having ends that intersect the first major surface.

2. The light guide of claim 1, wherein the first side surface includes a change in angle of the first side surface relative to a normal to the first major surface between the proximal end and the distal end.

3. The light guide of claim 2, wherein the change in angle of the first side surface between the proximal end and the distal end is 1° to 10°.

4. The light guide of claim 1, wherein the curvature is constant over a length of the first side surface between the proximal end and the distal end.

5. The light guide of claim 1, wherein the curvature varies over a length of the first side surface between the proximal end and the distal end.

6. The light guide of claim 1, wherein the second side surface has a curvature about the direction extending in the plane parallel to the first major surface.

7. The light guide of claim 6, wherein the second side surface includes a change in angle relative to a normal to the first major surface between the proximal end and the distal end.

8. The light guide of claim 6, wherein the respective curvatures of the first and second side surfaces are nominally the same.

9. The light guide of claim 6, wherein the respective curvatures of the first and second side surfaces are different.

10. The light guide of claim 1, wherein the direction extending in a plane parallel to the first major surface is parallel to the longitudinal axis.

11. A lighting assembly, comprising:
the light guide of claim 1; and
a light source adjacent the light input edge of the light guide and configured to edge light the light guide.

12. The light guide of claim 1, wherein the first side surface and the second side surface come together to form the ridge extending between the first end and the second end and having the ends that intersect the first major surface.

13. The light guide of claim 1, wherein the first side surface and the second side surface are connected by the end surface extending between the first end and the second end and having the ends that intersect the first major surface.

14. A light extracting element at a major surface of a light guide, the light extracting element comprising:
a proximal end at the major surface and a distal end extended in a thickness direction orthogonal to the major surface;
a longitudinal axis extending between a first end and a second end of the light extracting element along the first major surface; and
a first side surface extending between the proximal end and the distal end and extending between the first end and the second end, and a second side surface extending between the proximal end and the distal end and extending between the first end and the second end, the first side surface having a curvature about a direction extending in a plane parallel to the major surface, the first side surface and the second side surface either coming together to form a ridge or being connected by an end surface, the ridge or end surface extending between the first end and the second end and having ends that intersect the first major surface.

15. The light extracting element of claim 14, wherein the first side surface includes a change in angle of the first surface relative to a normal to the major surface between the proximal end and the distal end.

16. The light extracting element of claim 15, wherein the change in angle of the first side surface between the proximal end and the distal end is 1° to 10°.

17. The light extracting element of claim 14, wherein the second side surface has a curvature about the direction extending in the plane parallel to the major surface.

18. The light extracting element of claim 17, wherein the second side surface includes a change in angle of the second surface relative to a normal to the major surface between the proximal end and the distal end.

19. The light extracting element of claim 14, wherein the direction extending in a plane parallel to the major surface is parallel to the longitudinal axis.

20. A light guide, comprising:
a first major surface;
a second major surface opposed the first major surface;
a light input edge extending between the first major surface and the second major surface, the first major surface and the second major surface configured to propagate light input to the light guide through the light input edge therebetween by total internal reflection, the intersection of the light input edge and one of the first major surface and the second major surface defining a first axis, and at least a portion of the light guide curving about an axis orthogonal to the first axis; and
light extracting elements at the first major surface, at least a portion of the light extracting elements comprising:
a proximal end at the first major surface and a distal end spaced apart from the proximal end in a thickness direction orthogonal to the first major surface;
a longitudinal axis extending between a first end and a second end of the light extracting element along the first major surface; and
a first side surface extending between the proximal end and the distal end and extending between the first end and the second end, and a second side surface extending between the proximal end and the distal end and extending between the first end and the second end, the first side surface having a curvature about a direction extending along a surface contour of the first major surface, the first side surface and the second side surface either coming together to form a ridge or being connected by an end surface, the ridge or end surface extending between the first end and the second end and having ends that intersect the first major surface.

* * * * *